United States Patent [19]

Chappell et al.

[11] Patent Number: 5,471,188
[45] Date of Patent: Nov. 28, 1995

[54] FAST COMPARATOR CIRCUIT

[75] Inventors: Barbara A. Chappell; Terry I. Chappell, both of Amawalk; Bruce M. Fleischer, Mount Kisco; Stanley E. Schuster, Granite Springs, all of N.Y.

[73] Assignee: International Business Machines Corporation, Armonk, N.Y.

[21] Appl. No.: 320,477

[22] Filed: Oct. 7, 1994

[51] Int. Cl.$^6$ ................................................. G06F 7/02
[52] U.S. Cl. .................... 340/146.2; 365/189.07; 365/189.11
[58] Field of Search ............. 365/189.07, 189.11, 365/190; 340/146.2; 364/769

[56] References Cited

U.S. PATENT DOCUMENTS

| | | | |
|---|---|---|---|
| 4,031,511 | 6/1977 | Britton | 340/146.2 |
| 4,464,591 | 8/1984 | Rapp | 307/530 |
| 4,539,495 | 9/1985 | Demler | 307/530 |
| 4,810,910 | 3/1989 | Schoellikopf et al. | 307/530 |
| 4,933,905 | 6/1990 | Ootani | 365/190 |
| 4,935,719 | 6/1990 | McClure | 340/146.2 |
| 4,982,363 | 1/1991 | Sood | 365/189.01 |
| 5,023,841 | 7/1991 | Akrout et al. | 365/205 |
| 5,027,008 | 7/1991 | Runaldue | 307/443 |
| 5,031,147 | 7/1991 | Maruyama et al. | 365/189.07 |
| 5,032,744 | 7/1991 | Wai Yeung Liu | 307/491 |
| 5,130,692 | 7/1992 | Ando et al. | 340/146.2 |
| 5,140,188 | 8/1992 | Burns | 307/362 |
| 5,281,946 | 1/1994 | Van Le | 365/189.01 |
| 5,412,368 | 5/1995 | Gammack et al. | 340/146.2 |

Primary Examiner—David C. Nelms
Assistant Examiner—Vu A. Le
Attorney, Agent, or Firm—Perman & Green

[57] ABSTRACT

A fast comparator circuit, including a plurality of first switches operating in parallel. A first data bit from a first data word is input into a first input of each first switch, and a corresponding second data bit from a second data word is respectively input into a second input of each first switch. Each first switch provides a first logic state output when the first data bit matches the corresponding second data bit or a second logic state output when the first data bit does not match the second data bit. A plurality of second switches receive the respective logic state outputs and produce a combined output, indicating an all match or a mismatch, to a third switch combination connected to a first branch node and a second branch node to create a first voltage difference between the first and second branch nodes when an all match output results and a second voltage difference between the first and second branch node when a mismatch output results. A sense amplifier operates to amplify the voltage differentials that develope due to an imbalance caused in the conductance at the two branch nodes.

20 Claims, 6 Drawing Sheets

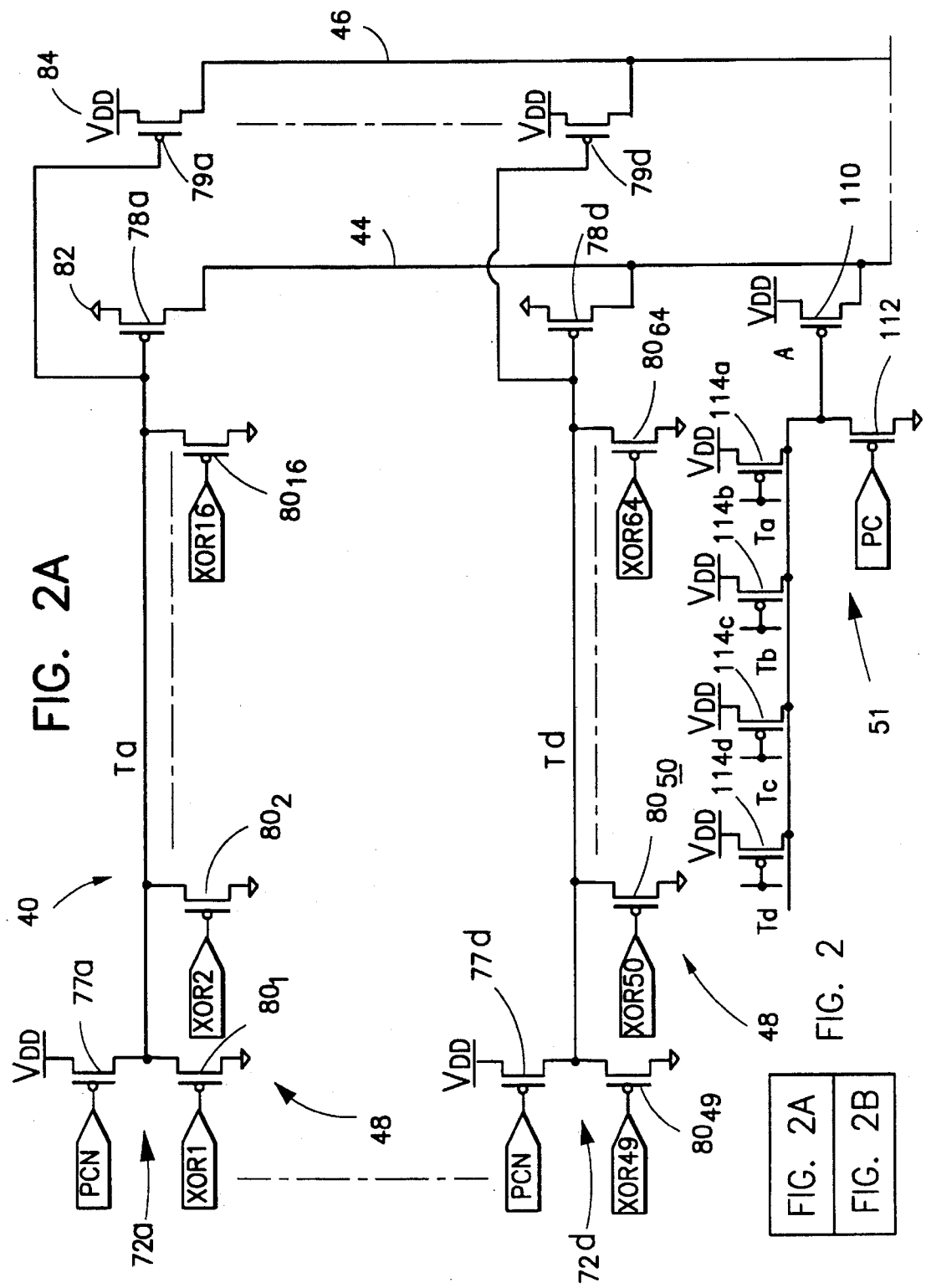

NOMINAL DELAY = 239 ps

NOMINAL DELAY = 249 ps

FAST COMPARATOR CIRCUIT

FIELD OF THE INVENTION

The present invention relates to comparator circuits, and more particularly to a comparator circuit capable of comparing long data words at high speeds.

BACKGROUND OF THE INVENTION

Digital comparator circuits (comparators) are required in various digital control, computer, and logic applications. A typical application of comparators is the decoding or recognition of a data word. It is highly desirable that comparators (as well as the other components in the digital circuit) be capable of high speed operation.

One problem with most prior art comparators of the type illustrated in FIG. 1 (more fully described below in the Detailed Description) is that they are often formed from an extended logic gate configuration arranged in series. Consequently, they require a relatively long time to process each digital word. When the number of digital words that are being compared in most digital computers are considered, it becomes evident that the use of relatively slow digital comparator devices adds considerable time to digital processing, computing, and storing.

In U.S. Pat. No. 5,031,147, titled "Semiconductor Memory", issued Jul. 9, 1991 to Maruyama et al., a counter comparator is disclosed having exclusive OR (hereafter referred to as "XOR") circuits followed by a static NOR, a clocked inverter, and a latch. The clocked inverter provides isolation between the latch and the NOR while the XOR outputs are changing. For wide comparator circuits which compare relatively long data words, the static NOR will require a relatively long time to process a compare command.

It would accordingly be desirable to form a comparator circuit which could operate reliably with fewer stages, and thereby provide a faster comparator circuit. It would be highly desirable that such a comparator circuit accomplish this operation with fewer components arranged in series.

SUMMARY OF THE INVENTION

The present invention relates to a fast comparator circuit, which indicates a match or mismatch between two data words and includes a plurality of first switches (XORs) operating in parallel, a plurality of second switches, responsive to the outputs of the first switches, for producing combined outputs to third switches which control a voltage difference across a first and a second branch node. More particularly, the data bits from a first data word are respectively input to first inputs of the plurality of first switches, and corresponding data bits from a second data word are respectively input into second inputs of the first switches. Each first switch compares the bits and provides a first logic state output when the first data word bit matches the second data word bit, and a second logic state output when the first data word bit does not match the second data word bit. The plurality of second switches are connected in parallel with each other and in series respectively with the plurality of first switches, and receive as inputs the logic state output of each of the first switches and produce a first combined logic state output, in response to a combination of inputs representing a bit match, and a second combined logic state output in response to a combination of inputs representing a bit mismatch. Third switch means, responsive to the first and second combined logic state outputs of the plurality of second switches, is coupled to both the first and second branch node and causes a first voltage differential between the nodes indicative of a combined output representing a bit match, and a second voltage differential between the nodes indicative of a combined output representing a bit mismatch. A sense amplifier operates to amplify the voltage differentials between the nodes.

BRIEF DESCRIPTION OF THE DRAWING FIGURES

FIG. 1 is a schematic illustration of one embodiment of a prior art digital comparator circuit using a combination of "EXCLUSIVE OR" (XOR) and OR gates.

FIG. 2, which is broken into segments (FIGS. 2A and 2B), illustrates one embodiment of a main portion of a fast comparator circuit 40 of the present invention.

DETAILED DESCRIPTION OF THE INVENTION

The specific component configurations illustrated herein are intended to be illustrative in nature and not limiting in scope. Similarly, the number of components and stages of the prior art embodiment and that of the present invention are selected to illustrate the delay associated with certain comparators, and are not intended to be limiting in scope. The present invention is also applicable to comparator circuits which possess a greater or lesser number of inputs and will save a greater or lesser amount of time if a respective greater or lesser number of inputs are used. In the following description, the term "HIGH" will refer to a high voltage logic level, while the term "LOW" will refer to a low voltage logic level. The use of the HIGH and LOW terms is somewhat arbitrary, however, since in some situations they may be reversed with no effect on the operation of the comparators of the present invention. Transistors function as switches as is well known in the art, and in this application, the terms "transistor" and "switch" may be used interchangeably.

Figure 1:
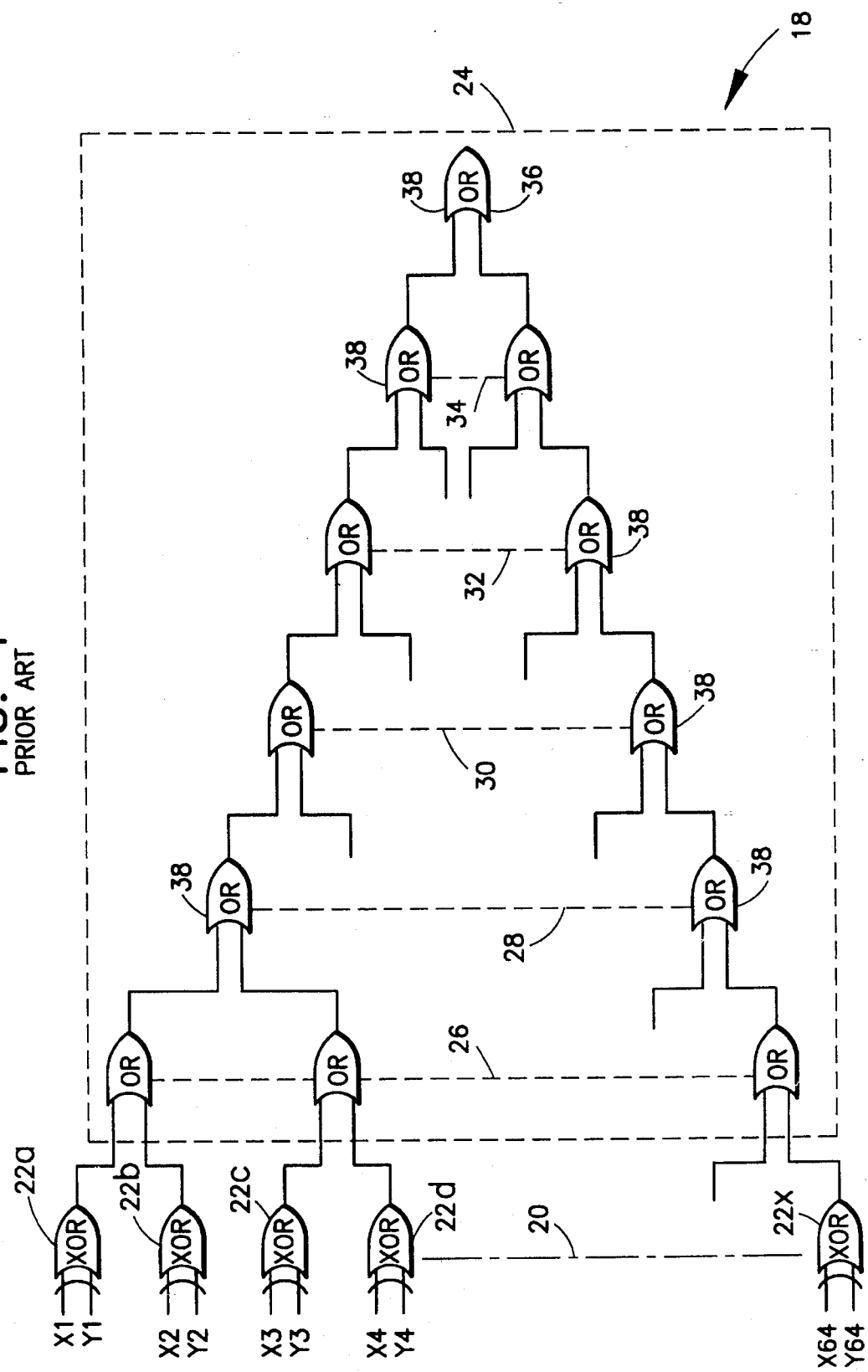

FIG. 1 Prior Art Embodiment

An example of the logic utilized in the prior art digital comparator circuit 18 illustrated in FIG. 1 involves a combination of exclusive OR, i.e., XOR, gates. In FIG. 1, a 64 input comparator is shown with a first stage 20 formed from 64 input XOR circuits 22a, 22b, 22c, . . . , 22x, only five of which are illustrated for ease of display. An OR circuit 24 consists of a second to a seventh stage 26, 28, 30, 32, 34, 36, respectively, of parallel two input OR gates 38. All of the outputs of the first stage 20 are paired such that two XOR gates have their outputs connected to an input of one of the second stage 26 OR gates. The second stage 26 (which is the first stage within the OR circuit 24) has 32 parallel OR gates, only a few of which are illustrated for ease of display. The outputs of each stage of OR gates 38, except the last, are paired as inputs into one OR gate of the next stage. In this manner, the third stage has 16 parallel OR gates; the fourth stage 30 has 8 parallel OR gates; the fifth stage 32 has 4 parallel OR gates; the sixth stage 34 has two parallel OR gates; and the seventh stage 36 has one OR gate. The addition of any further stages (arranged in series) of OR gates to the OR circuit 24 doubles the number of bits of the digital word which the comparator 18 is capable of comparing. The subtraction of any stages (arranged in series) of OR gates from the OR circuit 24 halves the number of bits of two data words which the comparator is capable of comparing. The comparator circuit 18 is connected as illustrated in FIG. 1. Wider OR gates (OR gates with more inputs) could be used to reduce the number of steps required to produce a single value as an output, but wider OR gates tend to operate more slowly than two input OR gates. There will be some optimum design value in the trade off between the number of inputs into each OR gate, and the number of stages. The OR circuit with this optimum design value is still slower than the improved configuration described in the present specification.

In order to compare data words in a 64 bit comparator circuit of the above configuration, each bit of the first data word X1 to X64 is compared to the second data word Y1 to Y64 at each respective XOR circuit 22a–22x of the first stage 20. The XOR circuits 22a–22x are paired (the outputs of a pair of two XOR circuits of stage 20 are fed as input to one of the OR gates 38 of the next stage 26). Pairing of the outputs of OR gates 38 from each stage continues in a similar manner from the second stage 26 through the sixth stage 34. There is only one OR gate 38 in the seventh stage 36. The problem with this configuration is that in order for the first data word (including bits X1 to X64) to be compared to the second data word (including bits Y1 to Y64), each process of comparing must progress through each of the seven stages 20, 26, 28, 30, 32, 34, and 36. This requires considerable time to process each compare signal. The time required to compare a relatively long data word can be reduced considerably by using the fast comparator circuit of the present invention.

The logic of the FIG. 1 circuit follows the convention that if any of the associated first data bits of the first data words do not match the corresponding data bits of the second data words, then a HIGH value will be output from the particular XOR gate, 22a–22x. If all of the first data bits of the first data word do match the second data bits of the second data word, then a LOW value will be output from all of the XOR gates 22a–22x. If one or more of the XOR gates 22a–22x is providing a HIGH output (indicating a mismatch of the respective first and the second digital word), then the corresponding OR gate 38 of the second stage 26 will output a HIGH voltage. Similarly, all of the corresponding OR gates 38 from the third stage 28 to the seventh stage 36 will output a HIGH voltage. Therefore, if the output of the OR gate 38 of the seventh stage 36 is HIGH, then there is an indication of a mismatch between at least one of the corresponding bits between the first word and the second word. If the output of the OR gate 38 of the seventh stage 36 is LOW, then there are no mismatches between the bits of the first data word and the second data word.

Fast Comparator Circuit

Figure 2B:
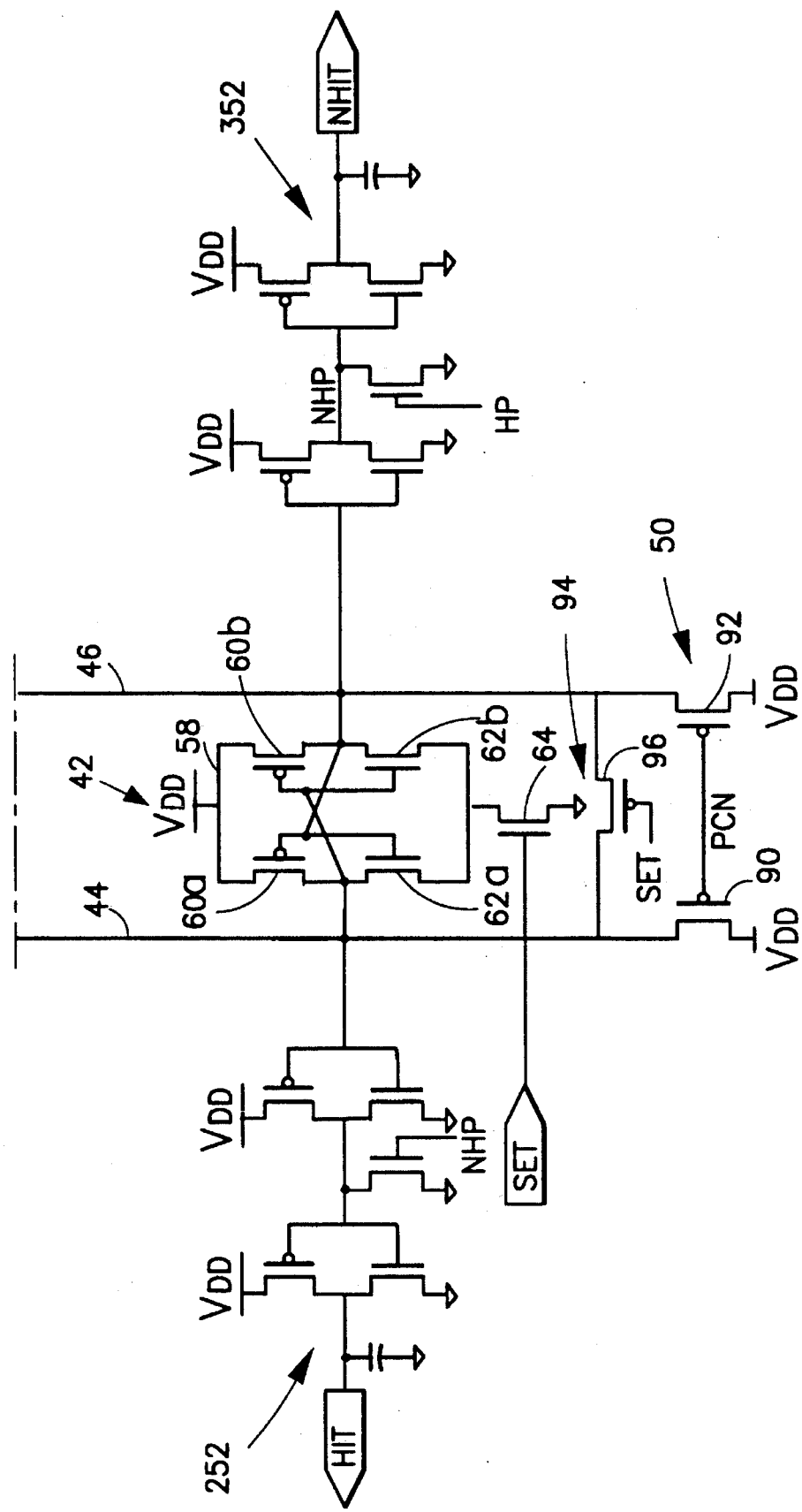
Figure 3:
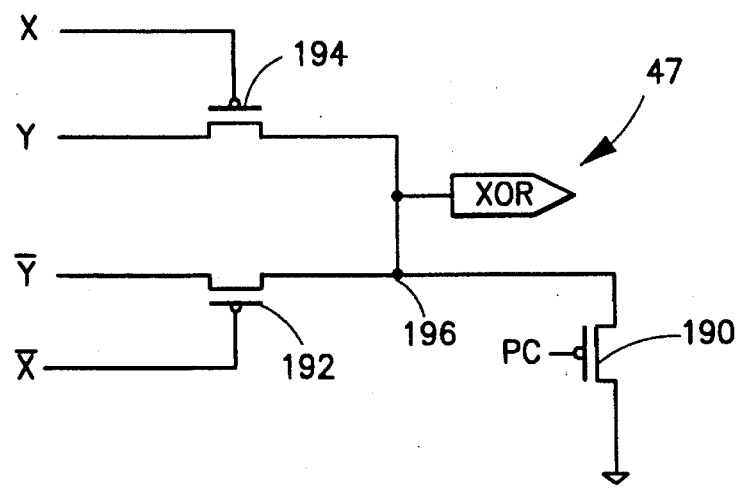
FIG. 3 illustrates one embodiment of a single XOR circuit of the present invention, which interacts with the main portion of the fast comparator circuit of FIG. 2.
Figure 4:
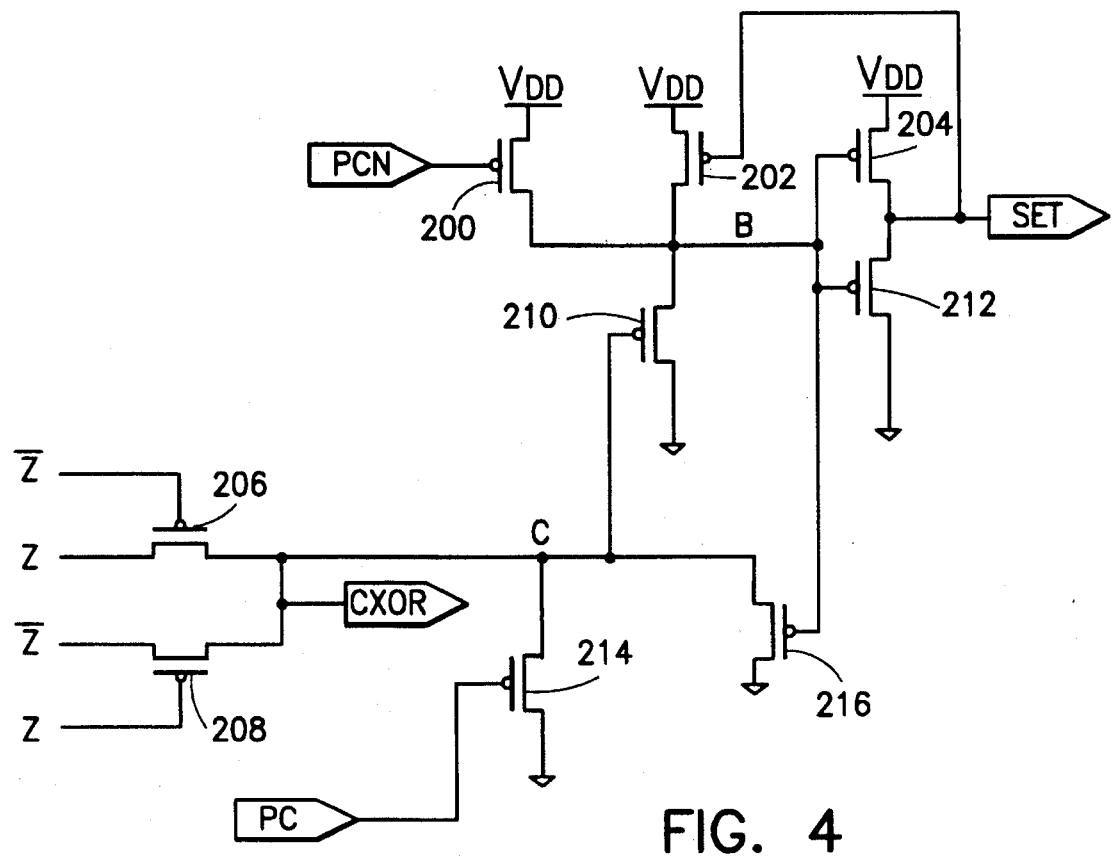
FIG. 4 illustrates one embodiment of a sense amplifier setting circuit of the present invention, which interacts with the main portion of the fast comparator circuit of FIG. 2.

Circuitry illustrating an embodiment of the present invention is shown in FIGS. 2–4 and utilizes well known CMOS technology. However, other devices which can perform the inverting and non-inverting functions described may be substituted for the CMOS devices. The fast comparator circuit (40) embodiment illustrated in FIGS. 2A, 2B, 3, and 4, is designed to be capable of comparing the data bits of two data words considerably faster than the FIG. 1 prior art embodiment (even if wider OR gates, resulting in the optimum design value described above, are used in that embodiment).

As seen in FIGS. 2A and 2B the components of the embodiment of the fast comparator circuit 40 generally include, in FIG. 2a, a comparator input portion 48; a preset portion 51; a first branch node 44 and a second branch node 46; and, in FIG. 2B, a sense amplifier portion 42; a precharge portion 50; and two voltage output detector portions 252, 352 (providing an amplified voltage signal to two distinct nodes, respectively). A series of operating and segmented nodes is provided between input portion 48 and the branch nodes 44 and 46 as will be described in detail below. These nodes operate during a compare cycle (i.e., from the setting of predetermined preliminary voltages on the circuit components, before inputting the bits of first and second data words to be compared, to the impressing of the output voltage on the branch nodes) to process the signals to indicate a match or mismatch.

In this embodiment, there are three time periods of interest in each compare cycle, the PRECHARGE, the COMPARE, and the SET periods. The first period is the PRECHARGE period, during which the voltages are precharged to preliminary values on the circuit components or nodes. During the COMPARE period, which follows the PRECHARGE period, each bit of a first data word is compared to the corresponding bit of a second data word. The results of these comparisons are used to unbalance the two branch nodes 44 and 46. During the SET period, this imbalance is amplified by the sense amplifier 42, driving nodes 44 and 46 to complementary logic levels. If the data words match, node 44 will go to $V_{DD}$ and node 46 to GND. If there is a mismatch in one or more bits, node 44 will go to GND and node 46 to $V_{DD}$.

During the PRECHARGE period, the PC (Precharge-Positive) nodes and PCN (Precharge-Negative) nodes are charged HIGH and LOW, respectively, precharging the other nodes to their appropriate values. During the other two periods, the logic values of the PC and PCN nodes are reversed. The SET node is charged LOW during both PRECHARGE and COMPARE periods, and HIGH during the SET period. In particular, during the PRECHARGE period, nodes XOR1–XOR64 are precharged LOW. Nodes Ta–Td are precharged HIGH by transistors 77a–77d, respectively. Node A, i.e., the gate of transistor 110, is precharged LOW. Branch nodes 44 and 46 are precharged HIGH through transistors 110, 96, 90, and 92.

At the beginning of the COMPARE period, transistors 90, 77a–77d, and 112 turn off. The nodes XOR1–XOR64 and A remain LOW dynamically, while nodes Ta–Td remain HIGH dynamically. Nodes 44 and 46 continue to be held HIGH through transistors 110 and 96. If there are no differences between the data words, then the nodes will maintain these voltages during the COMPARE period. At the end of the COMPARE period, nodes 44 and 46 wil both be at $V_{DD}$, but node 44 will be held to $V_{DD}$ through transistor 110 while node 46 will be held to $V_{DD}$ through p-channel transistors 110 and 96 in series. If there are one or more differences between the data words, at least one of the nodes XOR1–XOR64 will go HIGH, pulling the associated node Ta–Td LOW and pulling node A HIGH. One or more of nodes Ta–Td going LOW will turn on associated source follower(s) 78a–78d, establishing conductance from node 44 to GND, and turn on associated switch(es) 79a–79d, establishing conductance from $V_{DD}$ to node 46. Additionally node A going HIGH turns off transistor 110 removing it as a source of conductance from $V_{DD}$ to nodes 44 and 46. "Crowbar" device 94 remains on during the COMPARE period providing conductance between nodes 44 and 46. Thus, node 4 will have conductance to GND through source followers 78a–78d, and to $V_{DD}$ through one or more of the switches 79a–79d in series with transistor 96, while node 46 will have conductance to GND through source followers 78a–78d, in series with transistor 96, and to $V_{DD}$ through switches 79a–79d. By virtue of the crowbar device 94 being ON, and to the short time which these conductances to GND and $V_{DD}$ have to act during the COMPARE period, as well as to the parasitic capacitances on nodes 44 and 46, the voltage difference between nodes 44 and 46 will remain small in magnitude. At the end of the COMPARE period, nodes 44 and 46 will both be close to $V_{DD}$, With node 44 at a lower voltage than node 46. Except for crowbar device 94, node 44 has conductance only to GND while node 46 has conductance only to $V_{DD}$.

At the beginning of the SET period, the SET node is charged HIGH, turning off crowbar device 94, turning transistor 64 ON, and establishing conductance to GND from node 44, through transistors 62a and 64, and from node 46, through transistors 62b and 64. If the data words match, there will then be a conductance imbalance between nodes 44 and 46, with node 44 having conductance to $V_{DD}$ through transistor 110, and node 46 not having conductance to $V_{DD}$. If there is a mismatch in one or more bits, there will be both a voltage and conductance mismatch between nodes 44 and 46. In this case, node 44 will be at a lower voltage than node 46 and will have .conductance to GND through source followers 78a–78d, while node 46 will have conductance to $V_{DD}$ through switches 79a–79d.

During the SET period, the conductance (or conductance and voltage) imbalance between nodes 44 and 46 will be amplified by the sense amplifier portion 42. The sense amplifier portion 42 (FIG. 2B) is configured to operate during the SET period of operation and, as it SETs, causes the voltage differential between the first branch node 44 and the second branch node 46 to greatly increase, resulting in amplification of the voltage differential in keeping with the imbalance in the conductance at the two nodes. Consequently, an amplified voltage differential will be produced irrespective of whether a match or mismatch has been detected. This amplified output will therefore be indicative of either a match or mismatch. If the data words match, then at the end of the SET period node 44 will be HIGH and node 46 will be LOW. If there is a mismatch in one or more bits, at the end of the SET period node 44 will be LOW and node 46 HIGH.

The sense amplifier portion 42 includes a sense amplifier element 58 which is formed from a pair of p-channel transistors 60a, 60b, a pair of n-channel transistors 62a, 62b, and a SET n-channel transistor 64. The SET n-channel transistor 64 causes the sense amplifier portion 42 to be active only during the SET period. The drains of the p-channel transistor 60a and the n-channel transistor 62a are connected to the first branch node 44, while the drains of the p-channel transistor 60b and the n-channel transistor 62b are connected to the second branch node 46. All of the transistors are connected to a supply voltage $V_{DD}$.

Turning to the details of FIG. 2A, the comparator input portion 48 of the fast comparator circuit 40 (which receives 64 pairs of inputs to be compared) is operationally segmented into four segments 72a, 72b, 72c, 72d, with each segment comparing 16 bits of the first and second data word. For ease of illustration, only the first, and the last, of the four segments, 72a, 72d, are fully illustrated in the drawings with the remaining segments 72b and 72c being substantially identical and illustrated in phantom. The first segment 72a comprises a p-channel transistor 77a, 16 n-channel transistors $80_1$–$80_{16}$ and p-channel transistors 78a and 79a (which transistors are copied in the other segments 72b, 72c, and 72d, as 77b, $80_{17}$–$80_{32}$, and 78b, 79b; 77c, $80_{33}$–$80_{48}$, and 78c, 79c; and 77d, $80_{49}$–$80_{64}$, and 78d, 79d, respectively.)

The p-channel transistor 78a acts as a switch which selectively discharges the first branch node 44 to ground (indicated at 82). The p-channel transistor 79a acts as a switch which selectively holds the second branch node 46 at $V_{DD}$ (indicated at 84). Both p-channel transistors 78a and 79a turn on when the voltage at node Ta goes LOW. Node Ta, as well as several other nodes, is indicated at multiple locations in the FIGS. 2–4 embodiment. Nodes Ta and Td are associated with the first and fourth segments 72a and 72d, while the other nodes Tb and Tc are connected to segments 72b and 72c, respectively, but are not illustrated. Similarly, node Ta is connected to p-channel transistors 78a and 79a in a similar manner as nodes Tb and Tc are connected with p-channel transistors 78b, 79b, and 78c, 79c, respectively. The following description is directed to the first segment 72a, with the understanding that the other segments 72b, 72c, and 72d operate identically.

When there is a mismatch in at least one of the first 16 bits at XOR1–XOR16, the associated n-channel transistor $80_1$ to $80_{16}$ will be turned ON, grounding node Ta via that transistor. When node Ta goes LOW, the second branch node 46 is clamped to VDD via p-channel transistor 79a while the first branch node 44 is grounded via p-channel transistor 78a. Transistor 78a is sufficiently larger than p-channel transistor 110 that the first branch node 44 will still discharge towards GND even if transistor 110 is on and attempting to connect node 4=4 to $V_{DD}$. When there is a match of all of the 16 bits at XOR1–XOR16, node Ta remains HIGH, and p-channel transistors 78a and 79a remain off. The voltage level at the first branch node 44 is clamped to $V_{DD}$ by p-channel transistor 110, and the second branch node 46 is connected to the first branch node 44 by p-channel transistor 96 (FIG. 2B), until the SET period occurs. A precharge source PCN causes $V_{DD}$ to be applied to node Ta via a p-channel transistor 77a during the PRECHARGE period.

Referring to FIG. 2B, the precharge portion 50 includes p-channel transistors 90 and 92. The gates of the p-channel transistors are controlled by the PCN signal, such that during the PRECHARGE period, the p-channel transistors 90, 92 will turn ON (the gates of both are connected to PCN) causing the first branch node 44 and the second branch node 46 to both be at $V_{DD}$. During the COMPARE period and the SET period, the p-channel transistors 90, 92 turn off. The precharge portion 50 ensures that, during the PRECHARGE period, the first branch node 44 and the second branch node 46 will both be at $V_{DD}$.

The crow bar device 94 in FIG. 2B includes the relatively small p-channel transistor 96, which will be active at all times except during the SET period. The p-channel transistor 96 acts to equalize the voltage between the first branch node 44 and the second branch node 46 during the OFF period. During the COMPARE period, if the larger p-channel transistors (78a and 79a) are ON, then the effectiveness of the crow bar device 94 is nullified by the large current flow provided through transistors 78a and 79a.

In the FIG. 2B circuit, after the PRECHARGE period (when p-channel transistors 90 and 92 turn off), the second branch node 46 is connected to the first branch node via crow bar device 94. The preset portion 51 clamps the first branch node 44 at $V_{DD}$ prior to the COMPARE period. P-channel transistor 110 is smaller than p-channel transistor 78a (by a factor of three, for example) such that if p-channel transistor 78a is active, the effects of p-channel transistor 110 are limited. Only when p-channel transistor 78a is OFF does the p-channel transistor 110 hold the first branch node 44 to $V_{DD}$.

The preset portion 51 in FIG. 2A, which controls the operation of the p-channel transistor 110, comprises p-channel transistor 110, n-channel transistor 112, and p-channel transistor 114. P-channel transistor 114 is actually four such transistors 114a–114d, which are each connected to the corresponding nodes Ta, Tb, Tc, and Td in corresponding segments 72a, 72b, 72c and 72d. The preset portion 51 acts as a switchable dummy reference current device. The p-channel transistor 110 clamps $V_{DD}$ to the first branch node 44 whenever node A is LOW. Node A goes LOW when precharge signal PC goes HIGH (during the PRECHARGE period) via n-channel transistor 112. During the COMPARE period, nodes Ta–Td either remain HIGH or remain LOW depending upon whether there is one or more mismatches during the compare. If all of the nodes Ta–Td remain high, the p-channel transistors 114a–114d will remain off, and node A will remain low. With node A LOW, the first branch node 44 is connected to $V_{DD}$ via p-channel transistor 110. As noted, p-channel transistor 114 is actually transistors 114a–114d, each connected to the corresponding nodes Ta, Tb, Tc, and Td in corresponding segments 72a, 72b, 72c and 72d. Using a similar analysis, when any of nodes Ta, Tb, Tc, or Td go LOW, p-channel transistor 114 causes node A to rise to $V_{DD}$, thereby turning p-channel transistor 110 OFF.

XOR Circuit

A typical XOR (exclusive-or) circuit or element 47 of the present invention is illustrated in FIG. 3. Each of the n-channel transistors $80_1$ to $80_{64}$ of FIG. 2A is electrically connected at the drain to their respective nodes Ta–Td, at the source to ground, and at the gate to a distinct XOR element 47 of the type illustrated in FIG. 3. The function of each XOR element 47 is to output a HIGH voltage level when the first data bit X of the first data word in FIG. 3 does not match the corresponding data bit Y of the second data word, and a LOW voltage level when there is such a match. The XOR element 47 includes an n-channel transistor 190, and p-channel transistors 192 and 194. The gate and the source of p-channel transistor 194 are connected to the first and second data bits X, Y; and the gate and the source of p-channel transistor 192 are connected to the inverted first and inverted second data bits $\overline{X}$, $\overline{Y}$ as illustrated in FIG. 3. The drains of the p-channel transistors 192 and 194 are connected to a node 196. Node 196 is connected to the gate of one of a respective n-channel transistor $80_1$ to $80_{54}$ of FIG. 2A. Any time that a data bit of the first data word matches the corresponding data bit of the second data word, a LOW voltage will be applied to node 196 for that particular XOR element 47. Any time that the data bit X of the first data word does not match the corresponding data bit Y of the second data word, a HIGH voltage level signal will be applied through one of the p-channel transistors 192 or 194. During the PRECHARGE period, node 196 is LOW via n-channel transistor 190. The activation of inputs X and Y, and the corresponding inverted inputs, have an effect on nodes Ta–Td only during the COMPARE and SET periods.

The outputs of all of the XOR elements 47 (a distinct XOR element is associated with each n-channel transistor $80_1$ to $80_{64}$) are applied via n-channel transistors $80_1$–$80_{64}$ to one of the common nodes Ta–Td as illustrated in FIG. 2A. As explained, the transistors $80_1$–$80_{64}$ are segmented into four groups of 16, and each group of 16 transistors is applied to one of its respective segment nodes Ta–Td. If any of the XOR circuits 47 output a HIGH signal in any of the n-channel transistors $80_1$ to $80_{64}$ (indicating a data bit of the first data word does not match the corresponding data bit of the second data word), the associated node Ta, Tb, Tc, or Td is grounded. Note that a precharge p-channel transistor 77a originally sets node Ta at a HIGH voltage level whenever the PCN signal is active (during the PRECHARGE period.)

SET Node Operation

The elements shown in FIG. 4 control the signals applied to the SET node, which, in turn, controls the operation of the sense amplifier portion 42 of FIG. 2B. The SET node is ON during the SET period, and OFF during the PRECHARGE period and the COMPARE period. Included in the FIG. 4 portion of the sense amplifier circuit are the p-channel transistors 200, 202, 204, 206, and 208 as well as n-channel transistors 210, 212, 214 and 216. The voltage applied to the SET node is controlled by p-channel transistor 204, which when active applies the voltage $V_{DD}$ to the node; and also to n-channel transistor 212, which when ON grounds the SET node. When Node B is HIGH, n-channel transistor 212 turns ON and p-channel transistor 204 turns OFF. Similarly, when Node B goes LOW, p-channel transistor 204 turns ON while n-channel transistor 212 turns OFF. During the PRECHARGE period, p-channel transistor applies $V_{DD}$ to node B which causes the SET node to go LOW.

In FIG. 4, a voltage at node C will have an effect upon the voltage applied at node B. If the voltage applied at node C goes HIGH, such as is the case during the SET period, node B will be grounded via n-channel transistor 210. During the PRECHARGE period., node B is driven to $V_{DD}$ via transistor 200. During the PRECHARGE period, node C is grounded via n-channel transistor 214. During the PRECHARGE period, p-channel transistors 206, 208 will be OFF (the signals are illustrated as Z and Z), so the output at Node C will be LOW. During the COMPARE period, the signals Z and $\overline{Z}$ will be opposite, causing the voltage at node C to go HIGH (which will apply $V_{DD}$ to the SET node as described above). It is important that the signals from the XOR circuit that are used to SET the sense amplifier portion last sufficiently long to provide adequate operation of the sense amplifier. Therefore, the signals that are used to set the sense amplifier portion should last through the COMPARE and the SET periods.

The signals X, Y, and Z, as illustrated in FIGS. 3 and 4, are preferably three data bit inputs of the 64 bit input comparator circuit, which are applied via n-channel transistors $80_1$ to $80_{64}$. It is desired that the inputs Z and 3, which are illustrated in FIG. 4, be the slowest input bits of the 64 input bits applied to the 64 bit comparator. The rate of the signal inputs of each of the bits of the first data word and second data word are determined by the wiring distance that the bit inputs have to travel and/or the loading applied to the bit inputs. Since the inputs Z and $\overline{Z}$ are among the slowest data bit inputs in the FIGS. 2–4 embodiment, the SET period (the initiation of which depends upon the Z and $\overline{Z}$ inputs) commences near the end of the COMPARE period. The signals Z and $\overline{Z}$ are both applied as one of the 64 XOR input bits of the FIG. 3 (Z and $\overline{Z}$ are not illustrated in FIG. 3) and the FIG. 4 inputs required to SET the sense amplifier portion. In the above configuration, all of the inputs will be applied to the n-channel transistors $80_1$ to $80_{64}$ during the COMPARE period, and the application of the inputs Z and $\overline{Z}$ to the FIG. 4 portion of the circuit will begin the SET period, when the SET node is clamped to $V_{DD}$.

Operation Of The FIGS. 2 to 4 Embodiment

The precharge portion 50, during the PRECHARGE period, connects $V_{DD}$ to both the first branch node 44 and the second branch node 46 via the two p-channel transistors 90, 92. To further equalize the voltage level between the first branch node 44 and the second branch node 46, the crow-bar device 94 is active which creates a direct connection therebetween.

During the COMPARE period, if there are no mismatches of corresponding data bits between the first data word and the second data word being compared, the first branch node 44 is maintained at VOD, while the second branch node 46 is connected to the first branch node 44 via crow bar device 94. If there is a mismatch during the COMPARE period, the first branch node is connected to ground via the respective p-channel transistor 78a–78d, and the second branch node is connected to $V_{DD}$ via the p-channel transistor 79a–79d. The respective p-channel transistor 114a–114d turns ON whenever there is a mismatch between any of the first data word bits and the corresponding second data word bits in the respective segment, thereby connecting node A to $V_{DD}$, which represents the only time that node A is HIGH.

Nodes Ta–Td maintain HIGH voltage levels during the COMPARE and SET periods, except when one of the data bits of the first data word mismatches the corresponding data bits of the second data word in a respective segment, thereby turning ON the associated n-channel transistor $80_1$ to $80_{64}$, and grounding the respective node Ta to Td via that transistor. When any of nodes Ta to Td have a LOW voltage signal during the COMPARE period, the associated p-channel transistor 78a to 78d becomes active connecting the first branch node 44 to ground GND. Any of nodes Ta to Td going LOW also energize the corresponding p-channel transistor 114a–114d which sets node A HIGH. Node A going HIGH turns off p-channel transistor 110, and disconnects the first branch node 44 from $V_{DD}$. The combined effects of p-channel transistors 79a, 79b, 79c, 79d and p-channel transistors 78a, 78b, 78c, 78d, respectively (of segments 72a, 72b, 72c, and 72d, respectively) is to produce a LOW voltage in the first branch node 44 when there is a mismatch between a bit in the first data word and the corresponding bit of the second data word during the SET period. This combination of transistor states, during a mismatch, connects node 44 to GND via one of the transistors 78a 78d, and node 46 is connected to $V_{DD}$ via one of the transistors 79a–79d, so that during the SET period, node 46 remains HIGH and node 44 goes LOW.

If there is a match between all of the data bits of the first data word and the corresponding data bits of the second data word during the SET period, then the second branch node 46 will decrease to a lower voltage than the first branch node 44. If there is a mismatch between any of the data bits of the first data word and the corresponding data bits of the second data word, after the SET period the second branch node 46 will be at a higher voltage than the first branch node 44.

During the SET period, the sense amplifier portion 42 of FIG. 2B will act to increase the voltage difference between the branch nodes 44 and 46. Specifically, when there are no mismatches, sense amplifier portion 42 will maintain the first branch node 44 at $V_{DD}$, and permit the second branch node 46 to drop below $V_{DD}$. Conversely, the sense amplifier portion 42 will tend to accelerate grounding of the first branch node 44, and will keep the second branch node 46 at $V_{DD}$ when there is at least one mismatch between the data bits of the first data word and the corresponding data bits of the second data word. Hence, the setting of the sense amplifier 42 causes a voltage imbalance or difference to exist, and then to be enhanced, between the branch nodes 44, 46, which larger voltage difference becomes readily detectable. The enhancement becomes evident upon consideration that if, for example, the second branch node 46 is at a slightly higher voltage than the first branch node 44, as described above for a mismatch, then the p-channel transistor 60b will turn ON more than the p-channel transistor 60a, and the n-channel transistor 62a will turn ON more than the n-channel transistor 62b. As the sense amplifier SETs the voltage at the second branch node 46 will remain at $V_{DD}$ and the voltage at the first branch node 44 will be pulled to GND. Similarly, for a match compare, then the p-channel transistor 60a will turn ON more than the p-channel transistor 60b, and the n-channel transistor 62b will turn ON more than the n-channel transistor 62a. As the sense amplifier SETs the voltage at the first branch node 44 will remain at $V_{DD}$ and the voltage at the second branch node 46 will be pulled to GND.

The voltage output detector portion contains two symmetrical segments 252, 352 as illustrated in FIG. 2B. The segment to the left is the "HIT" segment 252 while the segment to the right is the "NO-HIT" segment. The function of the two segments 252, 352 is to provide gain and amplification of the voltages at the two branch nodes 44 and 46. Any other suitable circuit which provides gain and amplification of the voltages at these two nodes may be substituted for the voltage output detector portions 252 and 352 here.

One major advantage of the FIGS. 2–4 embodiment of the present invention as compared to the FIG. 1 prior art embodiment is that the FIG. 2–4 embodiment contains relatively few transistors (switches) whose gates are actuated in series to provide an indication of a match between all of the data bits of a first data word, and corresponding data bits of a second data word. In FIG. 2A, once the XOR gate 47 is actuated, only one of the gates of the n-channel transistors $80_1$ to $80_{64}$ must be actuated, which will, in turn, actuate one of the gates of the pair of p-channel transistors 78a and 79a to 78d and 79d. This requires that the gates of only two transistors be actuated in series to produce a desired voltage indication at the branch nodes 44, 46. There is a high level of parallel actuation in this configuration.

By comparison, in the FIG. 1 embodiment, once one of the XOR gates 22a to 22x is actuated, the corresponding OR gate in the second, third, fourth, fifth, sixth, and seventh stages 26, 28, 30, 32, 34, and 36 must each have their gates actuated in series by the prior stage. In the FIG. 1 configuration, there is very little parallel processing. If wider OR gates are used in place of the 2 input gates of the FIG. 1 configuration, then each OR gate will likely operate considerably slower than the FIG. 1 OR gates which have two inputs. Therefore, the present invention embodiment operates more rapidly than the FIG. 1 prior art embodiment.

Figure 5:
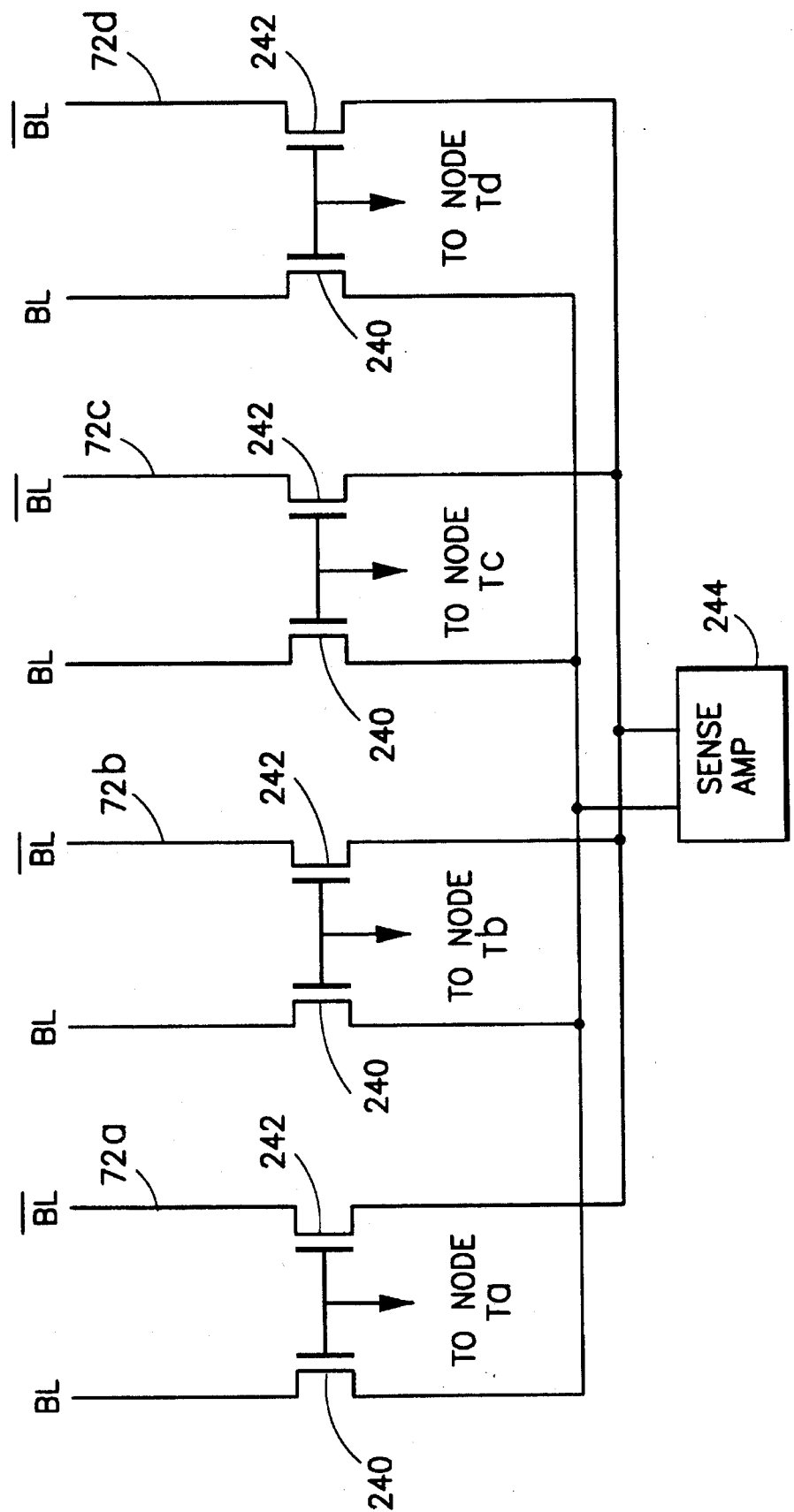
FIG. 5 illustrates an alternate embodiment of a sense amplifier circuit from that illustrated in FIGS. 2 and 4, which illustrates the superiority of the segmenting of the compare function of FIGS. 2A–2B.

The FIGS. 2A and 2B embodiment of the present invention is capable of segmenting the compare functions into a plurality of segments 72a–72d. FIG. 5 illustrates an embodiment utilizing a more conventional approach using resistive decoupling devices 240, 242 between a sense amplifier 244 and a plurality of compare segments 72a, 72b, 72c, 72c. The FIG. 5 configuration generally will not function as well as the FIGS. 2A–2B embodiment in that if a mismatch occurs in one of the segments 72a–72d, even though the input to the sense amp 244 will be discharged through the respective resistive decoupling devices 240, 242, the three non-discharged segments of FIG. 5 will oppose this discharge. This opposition to the discharge by the three opposing segments will slow down the differential build-up at the sense amplifier 244. Thus, such a segmenting of the compare circuits will produce slow, and possibly erroneous, results. If only one of the segments 72a–72d is used in the FIG. 5 configuration, then that segment will have to be made very wide to accommodate many XOR gates. For wider compare circuits, the FIG. 5 configuration will not be able to operate as quickly, or as reliably, as the FIGS. 2A–2B embodiment.

Figure 6:
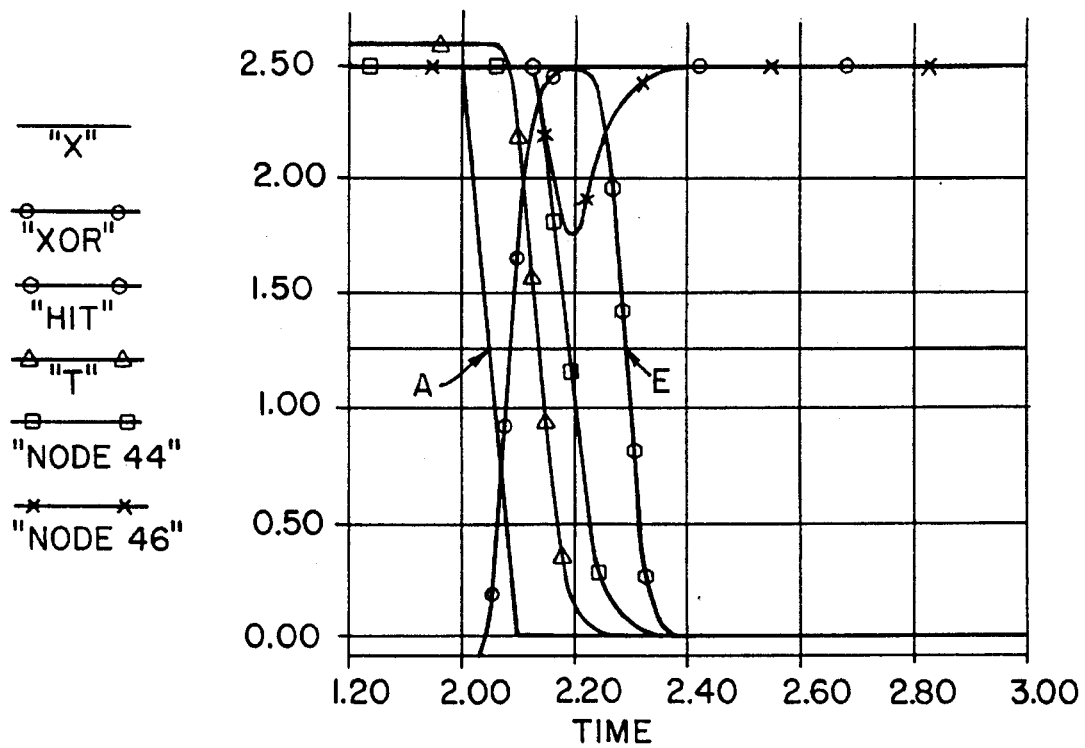
FIG. 6 is a graphical illustration of the operation of the comparator circuit of FIGS. 2 to 4 when the first data word does not match the second data word.
Figure 7:
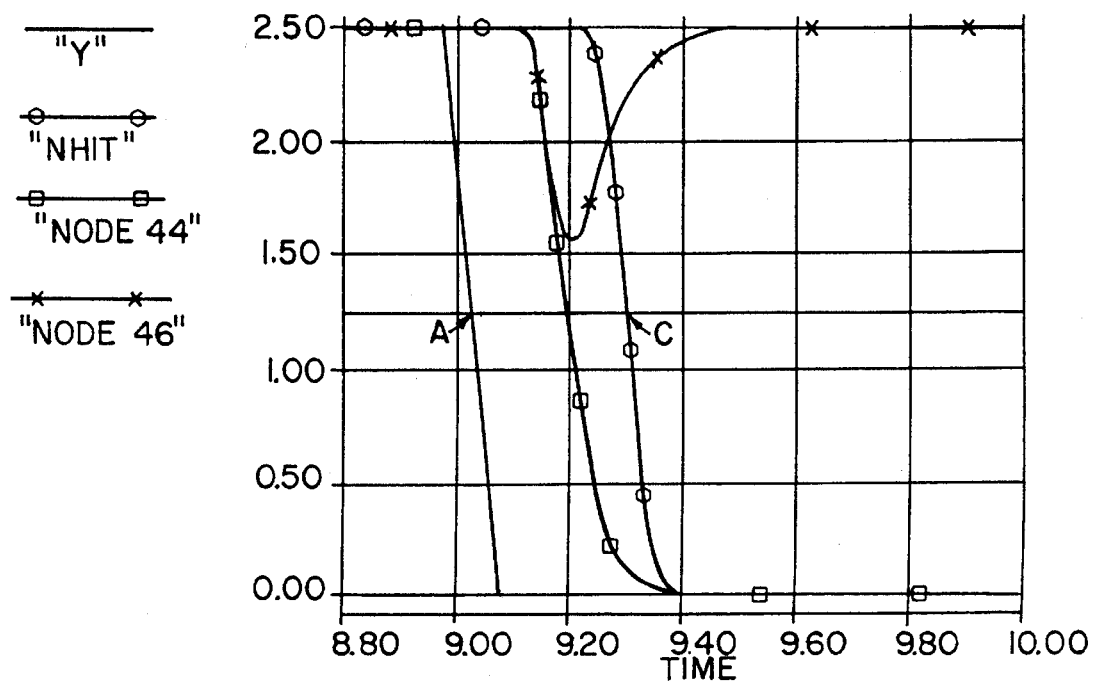
FIG. 7 is a graphical illustration of the operation of the comparator circuit of FIGS. 2 to 4 when the first data word matches the second data word.

FIGS. 6 and 7 diagram the operation of the comparator circuit illustrated in FIGS. 2 to 4. FIG. 6 illustrates various circuit voltages when at least one bit X (see FIG. 3) of the first data word does not match the corresponding bit Y of the second data word. FIG. 7 illustrates the various circuit voltages when all of the data bits X (see FIG. 3) of the first data word match the corresponding data bits Y of the second data word. The various labels in FIGS. 6 and 7 correspond to the voltages at the labelled nodes in the FIGS. 2 to 4 embodiment. It is assumed that both the X and Y signals were precharged HIGH, and that the Y signal occurred prior to the X signal. If the X and the Y signals start at the same time, then it is preferred that the X inputs start LOW and the Y inputs start HIGH.

It is worth noting in FIG. 6 that the comparator output, when there are mismatches, can occur in 239 ps, with the second branch node 46 remaining HIGH while the first branch node 44 goes LOW. Similarly, in FIG. 7 the comparator output, when there is a complete match between the first and the second data words, can occur in 249 ps, with the second branch node 46 going LOW while the first branch node remains HIGH.

As already indicated, the FIGS. 2–4 embodiment of the comparator (which uses a combination of memory-like sensing with a technique for segmenting the compare) functions faster than the FIG. 1 prior art embodiment. The FIGS. 2–4 embodiment also limits the relatively long series of "AND" gates connected in series in wide comparators, which provides for a relatively slow comparator since the propagation delay of each stage of "AND" gates has to be added in determining the total duration of the COMPARE period. Further, the embodiment of the invention, only two p-channel transistors (80, and both 78a and 79a in parallel, for example), which are arranged in series must be energized to alter the voltage difference between the first branch node 44 and the second branch node, once the output of any XOR element goes HIGH.

While the invention has been particularly shown and described with respect to preferred embodiments thereof, it will be understood by those skilled in the art that changes in form and details may be made therein without departing from the scope and spirit of the invention. It is considered within the scope of the present invention to modify the specific logic gate configuration to produce another fast compare circuit with similar characteristics.

What is claimed is:

1. A fast comparator circuit, comprising:

a plurality of first switch means for respectively receiving a data bit from a first data word into a first input thereof and for receiving a corresponding data bit from a second data word into a second input thereof, and each of said first switch means providing a first logic state output when said first word data bit matches said corresponding second word data bit and a second logic state output when said first word data bit does not match said corresponding second word data bit;

a plurality of second switch means, connected in parallel with each other and in series respectively with said plurality of first switch means, for receiving as inputs the logic state output of each of said first switch means, said second switch means producing a first combined logic state output, in response to the combination of said inputs representing a bit match, and a second combined logic state output in response to the combination of said inputs representing a bit mismatch;

a first branch node and a second branch node; and third switch means, responsive to the first and second combined logic state outputs of said plurality of second switch means and coupled to both said first branch node and said second branch node, for providing a first voltage differential between said first branch node and said second branch node indicative of a combined output representing a bit match, and a second voltage differential between said first branch node and said second branch node indicative of a combined output representing a bit mismatch.

2. The fast comparator circuit as in claim 1, further comprising indicator means for indicating an occurrence of said first voltage differential or said second voltage differential.

3. The fast comparator circuit as in claim 2, further comprising precharge means for applying a predetermined precharge potential to said first branch node and said second branch node prior to each receiving of a first data word and second data word by said plurality of first switch means.

4. The fast comparator circuit as in claim 3, wherein said precharge means comprises means for limiting any voltage differential between said first branch node and said second branch node.

5. The fast comparator circuit as in claim 4, further comprising means for nullifying said limiting means prior to indicating an occurrence of said first voltage differential or said second voltage differential by said indicator means.

6. The fast comparator circuit as in claim 1, further comprising sense amplifier means, coupled to both said first branch node and said second branch node, for amplifying a voltage differential between said first branch node and said second branch node.

7. The fast comparator circuit as in claim 1, wherein said plurality of first switch means comprise XOR elements.

8. The fast comparator circuit as in claim 1, wherein said plurality of second switch means and said third switch means comprise transistors.

9. The fast comparator circuit as in claim 1, wherein said plurality of first switch means, said plurality of second switch means, and said third switch means comprise a segment of said circuit, and said circuit comprises a plurality of said segments.

10. A fast comparator circuit, comprising:

a plurality of first switches operating in parallel, each said first switch having a first input of a data bit of a first data word and a second input of a corresponding data bit of a second data word and providing a first logic state output when said first word data bit matches said second word data bit, and a second logic state output when said first word data bit does not match said second word data bit;

second means, coupled to the outputs of said plurality of first switches and operable after the completion of a cycle of comparing said data bits by said plurality of first switches, for providing a first output when all of said outputs are of the same logic state and a second output when all of said outputs are not of the same logic state;

a first branch node and a second branch node;

third means, coupled to the outputs of said second means and operable after the completion of a cycle of comparing said data bits by said plurality of first switches, for providing a first voltage difference between said first branch node and said second branch node when all of said outputs are of the same logic state and a second voltage difference when all of said outputs are not of the same logic state; and sense amplifier means coupled between said first branch node and said second branch node for amplifying said voltage differences.

11. The fast compare circuit as in claim 10, further comprising means for dividing said cycle of comparing into a PRECHARGE period, a COMPARE period, and a SET period, and means for activating said sense amplifier means during said SET period.

12. The fast comparator circuit as in claim 11, further comprising precharge means coupled to said first branch node and said second branch node for applying a predetermined voltage to said first branch node and said second branch node during said PRECHARGE period.

13. The fast comparator circuit as in claim 10, wherein said first switches are arranged in a plurality of segments, and each segment comprises at least one XOR element.

14. The fast comparator circuit as in claim 10, wherein said second means and said third means comprise transistors.

15. A method for comparing each data bit from a first data word with a corresponding data bit from a second data word, comprising the steps of:

configuring a plurality of first switches in parallel, each first switch having a first input for receiving a data bit from the first data word and a second input for receiving a corresponding data bit from the second data word;

inputting corresponding data bits from said first data word and said second data word respectively to said first and second inputs of each of said first switches to compare said corresponding bits and having each first switch provide a first logic state output when said first data word bit matches said second data word bit, and a second logic state output when said data bits do not match;

configuring a plurality of second switches to receive the logic state outputs of said first switches and producing a first combined logic state output when all of the first switch logic state outputs match and a second logic state output when all of said first switch logic state outputs do not match; and using the logic state output of said second switches, after the completion of a compare cycle, to provide a first voltage difference between a first branch node and a second branch node when all of said outputs are of the same logic state, and a second voltage difference between said first and second branch nodes when any of said outputs do not match.

16. The method as in claim 15, further comprising the steps of dividing said compare cycle into a PRECHARGE period, a COMPARE period, and a SET period, and coupling a sense amplifier to both said first branch node and said second branch node and amplifying the voltage difference between said first branch node and said second branch node during said SET period.

17. The method as in claim 16, further comprising the step of causing the voltage at the end of said COMPARE period to become greater in said first branch node than said second branch node when all of said outputs match, and greater in said second branch node than said first branch node when any of said outputs do not match.

18. The method as in claim 16, further comprising the step of applying a predetermined voltage to said first branch node and to said second branch node during said PRECHARGE period.

19. The method as in claim 16, further comprising the step of indicating whether the first voltage difference or the second voltage difference exists between said first branch node and said second branch node after said SET period.

20. The method as in claim 15, wherein said first voltage difference and said second voltage difference are opposite in polarity between said first and second branch nodes.

* * * * *

UNITED STATES PATENT AND TRADEMARK OFFICE
CERTIFICATE OF CORRECTION

PATENT NO. : 5,471,188

DATED : November 28, 1995

INVENTOR(S) : Chappell et al.

It is certified that error appears in the above-identified patent and that said Letters Patent is hereby corrected as shown below:

IN THE DRAWINGS:

Figure 2A  -  transistors $80_1$, $80_2$, $80_{16}$, $80_{49}$, $80_{50}$, $80_{64}$, and 112,
shown as p-channel,
should be n-channel;

Figure 3  -  transistor 190, shown as p-channel,
should be n-channel;

Figure 4  -  transistors 210, 212, 214, and 216,
shown as p-channel,
should be n-channel; and Figure 5  -  transistors 240 and 242,
shown as n-channel,
should be p-channel.

Signed and Sealed this

Twenty-eighth Day of May, 1996

Attest:

BRUCE LEHMAN

*Attesting Officer*  *Commissioner of Patents and Trademarks*